United States Patent
Chen et al.

(10) Patent No.: US 7,425,827 B2
(45) Date of Patent: Sep. 16, 2008

(54) METHOD AND APPARATUS FOR FORMATION EVALUATION AND BOREHOLE SIZE DETERMINATION

(75) Inventors: Songhua Chen, Katy, TX (US); Carl M. Edwards, Katy, TX (US); Thomas Kruspe, Wienhausen (DE); Martin Blanz, Celle (DE); Holger F. Thern, Hannover (DE); David R. Beard, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/541,227

(22) Filed: Sep. 29, 2006

(65) Prior Publication Data

US 2007/0075706 A1   Apr. 5, 2007

Related U.S. Application Data

(60) Provisional application No. 60/723,051, filed on Oct. 3, 2005.

(51) Int. Cl.
*G01V 3/00* (2006.01)

(52) U.S. Cl. .................................................. 324/303

(58) Field of Classification Search ............... 324/303; 702/1–13
See application file for complete search history.

(56) References Cited

U.S. PATENT DOCUMENTS

| 5,491,488 | A | 2/1996 | Wu ............................ 343/719 |
| 5,828,214 | A | 10/1998 | Taicher et al. ............... 324/303 |
| 6,237,404 | B1 * | 5/2001 | Crary et al. ............... 73/152.03 |
| 6,727,696 | B2 | 4/2004 | Kruspe et al. ............... 324/303 |
| 6,801,039 | B2 | 10/2004 | Fabris et al. ................ 324/324 |
| 2005/0030034 | A1 | 2/2005 | Ganesan ..................... 324/324 |

FOREIGN PATENT DOCUMENTS

EP   0939195 A2   9/1999

* cited by examiner

*Primary Examiner*—Brij B. Shrivastav
*Assistant Examiner*—Dixomara Vargas
(74) *Attorney, Agent, or Firm*—Madan, Mossman & Sriram, P.C.

(57) ABSTRACT

The quality factor of a NMR-antenna depends upon mud conductivity, formation resistivity and the borehole size. The Q of the antenna is measured. From measurement of one of formation conductivity or borehole size, the other can be determined.

24 Claims, 10 Drawing Sheets

METHOD AND APPARATUS FOR FORMATION EVALUATION AND BOREHOLE SIZE DETERMINATION

CROSS-REFERENCES TO RELATED APPLICATIONS

The present application claims priority from U.S. Provisional Patent Application Ser. No. 60/723,051 filed on 3 Oct. 2005.

BACKGROUND OF THE INVENTION

1. Field of the Invention

The invention is related to NMR logging techniques in a downhole environment in petrophysical testing. In particular, the invention quantifies the effects of borehole size, formation resistivity and invasion on measurements that can be made with a NMR tool.

2. Description of the Related Art

Nuclear Magnetic Resonance (NMR) has uses in many areas, including the fields of medicine, chemistry, non-destructive testing, and in well logging in the oil exploration industry. In the well logging industry, NMR wireline logging or measurement-while-drilling (MWD) instruments are useful for collecting information on earth formation properties and for characterizing reservoir fluids. NMR is used in determining properties such as porosity of the formation, permeability, the movable fluid volume (BVM), the clay bound volume (CBW) and bulk volume irreducible (BVI), as well as other formation and reservoir fluid properties.

In a typical NMR device used in logging, a permanent magnet produces a static magnetic field and establishes a direction of orientation for nuclear magnetic moments in the vicinity of the borehole. An RF field is applied in the plane perpendicular to the static magnetic field. Typically in the art, the static field $B_0$ is a function of distance from the tool. Thus, at a given applied frequency, the NMR resonance condition must be satisfied, wherein $$f = \frac{\gamma B_0}{2\pi} \quad (1)$$

where f is the frequency of the RF field, and γ is the gyromagnetic ratio. Nuclei that are influenced by the applied RF field typically lie within a certain volume, named the sensitive volume. For a selected operating frequency, the location and size of the sensitive volume are determined by the magnetic field intensity, the field gradient and the effective bandwidth of the pulse. In multi-frequency logging, a discrete number of closely spaced and substantially non-overlapping sensitive volumes can be obtained. The union of these sensitive volumes is defined as the region of examination of a given tool with a given acquisition method.

In centralized tools, the region of examination is a cylindrical shell which is coaxial with the permanent magnet, although other spatial arrangements can be used. Since the region of examination typically lies close to the surface of the borehole cavity, a perfectly coaxial alignment of the tool and borehole wall, in which the borehole wall is circular and smooth, would yield optimal values of echo signals. Occasionally though, geometric anomalies concerning the logging tool and the surface of the borehole will result in portions of the region of examination lying inside the borehole cavity rather than inside the rock formation. As one example of possible anomalies, the tool can be off-axis with the borehole and additionally can be lying against one side of the borehole, revealing a portion of the region of examination to the borehole cavity. In another example, the borehole might have an elliptical cross-section rather than a circular one. In yet a third possibility, there can be a significant amount of washout, where certain segments of the wall have separated and fallen away, leaving a cavity to one side of the borehole.

Measurements made with NMR logging instruments, being electromagnetic measurements, are responsive to a greater or lesser degree, on other formation and borehole properties besides those related to nuclear spins. This is recognized in U.S. Pat. No. 5,828,214 to Taicher et al, having the same assignee as the present invention and the contents of which are incorporated herein by reference. Taicher teaches an NMR apparatus in which the frequency of the RF field is varied. It is shown that the phase difference between the RF field and the resonance signal depends upon the conductivity of the path over which the RF field and the signals travel. By measuring phase differences at two different frequencies, it is possible to determine the conductivity as a function of radius.

NMR signals are also affected by the borehole size. Drilling mud is typically used to facilitate drilling, and therefore yields a constant presence within the borehole. Typically, drilling mud is either oil-based (including synthetic oil-based), water-based, or glycol-based and hence has a large number of hydrogen nuclei. Due to the large number of hydrogen nuclei, the mud is a strong source of contamination in NMR spin echo signals, and the contamination signals can be greater than the desired signals obtained from the rock formation. U.S. patent application Ser. No. 10/855,230 of Chen et al. having the same assignee as the present application and the contents of which are incorporated herein by reference uses echo signals acquired from a plurality of different regions of investigation at different depths of investigation. The echo signals are analyzed to obtain an indication of possible presence of a borehole fluid in at least one of the regions of examination.

The methods discussed by Taicher and by Chen thus provide information about the formation resistivity and borehole size, something that is different from the main objective of determining formation porosities and relaxation time distributions. They both rely on the use of relatively weak NMR signals to estimate the parameters of interest. It would be desirable to have a method and apparatus that uses stronger signals to determine the same parameters. The present invention satisfies this need.

SUMMARY OF THE INVENTION

One embodiment of the invention is a method of evaluating an earth formation and a borehole within the formation. A downhole tool is conveyed into the borehole. The quality factor of the one or more antennas on the downhole tool is measured. From the measured Q, knowledge of the borehole fluid resistivity and knowledge of the formation resistivity, the size of the borehole may be determined. The determined size may be used for quality control of the data acquired with the downhole tool. When measurements are made with a multivolume NMR tool, the determined size of the borehole may be an indication for further processing of the NMR data to identify the borehole fluid fraction in each of the regions of investigation and to correct the NMR data for the effect of borehole fluid. The borehole fluid resistivity may be obtained by actual downhole measurements or by correcting wellsite measurements for downhole temperature. When the borehole size is known, the processor may use the Q and mud resistivity to estimate formation resistivity.

Another embodiment of the invention is an apparatus for evaluating an earth formation and a borehole within the formation. A downhole tool is conveyed into the borehole to acquire NMR signals. The quality factor of the one or more antennas on the downhole tool is measured. A processor determines the size of the borehole from the measured Q, knowledge of the borehole fluid resistivity and knowledge of the formation resistivity. The processor may use the determined size for quality control of the acquired NMR data. When measurements are made with a multivolume NMR tool, the processor may further use the determined size of the borehole as an indication for further processing of the NMR data to identify the borehole fluid fraction in each of the regions of investigation and to correct the NMR data for the effect of borehole fluid. A resistivity device may be used for measurement of the fluid resistivity. Alternatively, the processor determines the formation resistivity from the measured Q, knowledge of the borehole fluid resistivity and measurement of borehole size. An acoustic or mechanical caliper may be used for measuring borehole size. A wireline, a drilling tubular or a slickline may be used to convey the NMR tool into the borehole.

BRIEF DESCRIPTION OF THE DRAWINGS

The present invention is best understood with reference to the accompanying figures in which like numerals refer to like elements and in which.

DETAILED DESCRIPTION OF THE INVENTION

Figure 1:
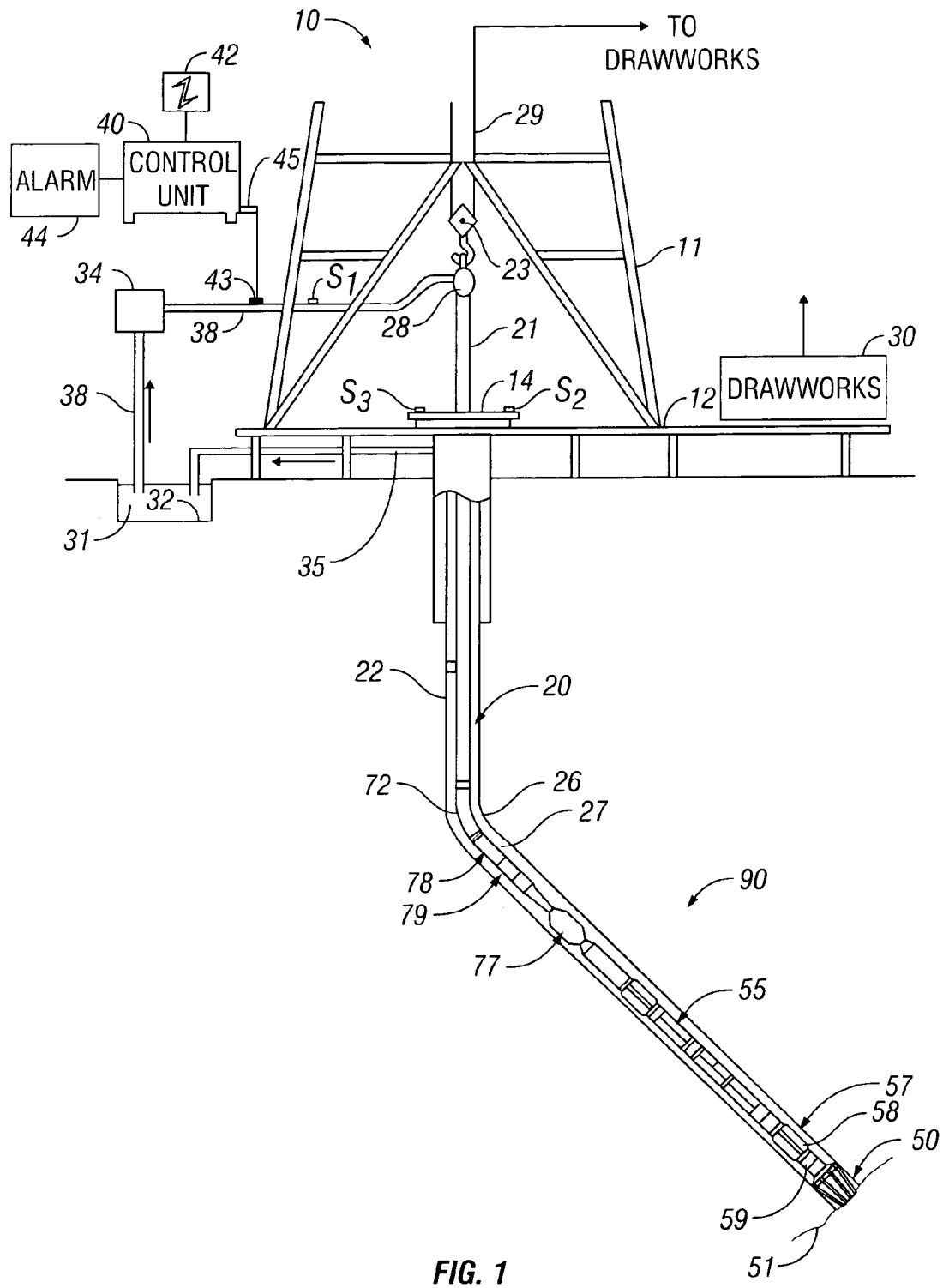
FIG. 1 (Prior Art) shows a measurement-while-drilling tool suitable for use with the present invention.

FIG. 1 shows a schematic diagram of a drilling system 10 with a drillstring 20 carrying a drilling assembly 90 (also referred to as the bottomhole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 38 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ typically placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In an exemplary embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters typically include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 typically includes a computer or a microprocessor-based processing system, memory for storing programs or models and data, a recorder for recording data, and other peripherals. The control unit 40 is typically adapted to activate alarms 44 when certain unsafe or undesirable operating conditions occur.

Figure 2:
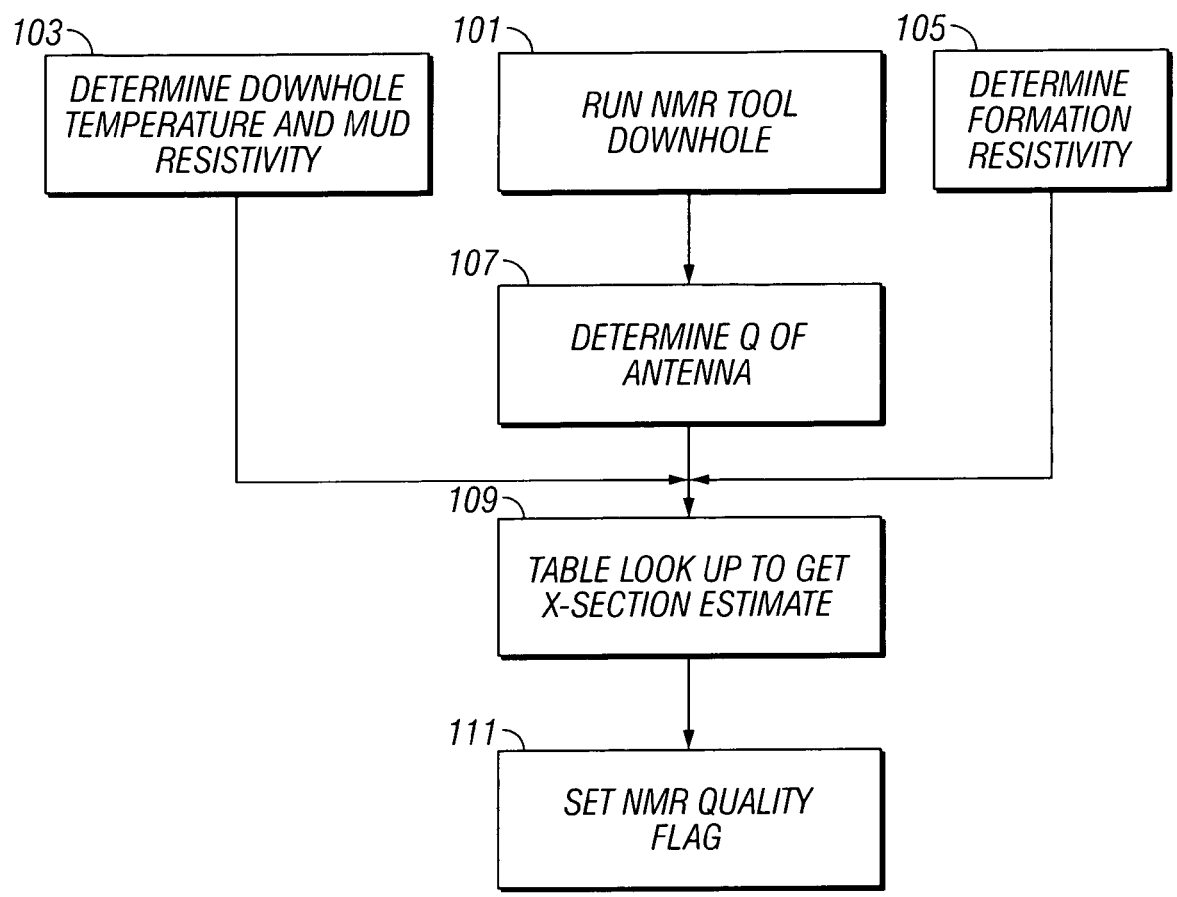
FIG. 2 is a flow chart summarizing one embodiment of the invention.

One embodiment of the present invention is depicted by the flow chart of FIG. 2. The NMR tool is run in the borehole 101. The NMR tool could be any suitable tool that includes a magnet which produces a static magnetic field in a region of investigation in the earth formation, and an antenna arrangement which pulses the formation with a RF magnetic field and receives signals resulting from changes in the polarization of nuclear spins. Some devices use the same antenna for transmitting and receiving whereas other devices use separate transmitter and receiver antennas. The method of the present invention can be used with either type of antenna arrangement.

A suitable single frequency NMR device is disclosed, for instance, in U.S. Pat. No. 6,727,696 of Kruspe et al, the contents of which are incorporated herein by reference. A multi-frequency, side-looking wireline tool is disclosed, for example, in U.S. Pat. No. 6,348,792 to Beard et al, the contents of which are incorporated herein by reference. Using the NMR tool, measurements are made of the formation properties using known pulse sequences. In addition, the quality factor (Q) of the antenna is measured 107 using a suitable signal applied to one or more antennas of the antenna arrangement. $Q/2\pi$ is defined as the ratio of the amount of peak energy stored in the coil to the amount of energy that is dissipated in one cycle. Concurrently, measurements are also made of the borehole temperature and estimates of the mud resistivity obtained 103. The temperature measurements may be made by a thermometer. The mud resistivity may be measured downhole using the apparatus described U.S. Pat. No. 6,801,039 to Fabris et al. (or a modification thereof), the contents of which are incorporated herein by reference. Alternatively, the formation resistivity may be obtained by correcting surface mud resistivity measurements (or standard measured values) for the elevated downhole temperature. In addition, formation resistivity measurements are made 105. For MWD applications, this may be done using the multiple propagation resistivity device of U.S. Pat. No. 5,491,488 to Wu. For wireline applications, multiarray induction logging tools can be used to determine the formation resistivity.

A table look-up is then performed 109 relating the determined Q, mud and formation resistivities and temperatures to a borehole cross section estimate. This may be referred to as a borehole size indicator (BSI). The borehole-cross section estimate is based on simulations of the Q for the known antenna structure of the NMR logging tool for a range of values of borehole diameter, formation resistivity, mud resistivity and temperature. These simulations are precomputed and stored in a suitable memory that is accessible by the downhole tool: the table look-up then involves interpolating between the stored values to get an estimate of the borehole cross section. The borehole-cross section estimate is semi-quantitatively related to the area of the borehole since, for boreholes that are reasonably circular, the Q is a monotonic function of the cross section.

In one embodiment of the present invention, the borehole-cross section estimate is used to flag the NMR data 111 as a quality indicator, so that NMR data made with abnormally large cross sections are not used in evaluating the formation NMR properties. Optionally, once measurements at a particular depth have been flagged, by using the method of Chen, it is possible to identify the fraction of each of the sensitive volumes of a multifrequency NMR tool that is contaminated by borehole fluid and then process the NMR data to restore them to a state corresponding to 0% contamination. As discussed in Chen, a multifrequency NMR logging tool is conveyed into a borehole in the earth formation. Echo signals are acquired from a plurality of different regions of investigation at different depths of investigation. In one embodiment of the invention, this is accomplished by acquisition at a plurality of frequencies. Each of the plurality of frequencies has a different region (different volume) of examination in the earth formation. In an alternate embodiment of the invention, different depths of investigation are obtained using a field shifting magnet. The echo signals are analyzed to obtain an indication of possible presence of a borehole fluid in at least one of the regions of examination. In one embodiment of the invention, a porosity associated with each of the different regions of examination is determined and the determined values of porosity are compared. The porosity determination may be done by inverting the echo signals. The echo signals may include trainlets with a short wait time, and analysis of the signals may be based on determination of the sum of echoes in the trainlets.

Figure 3:
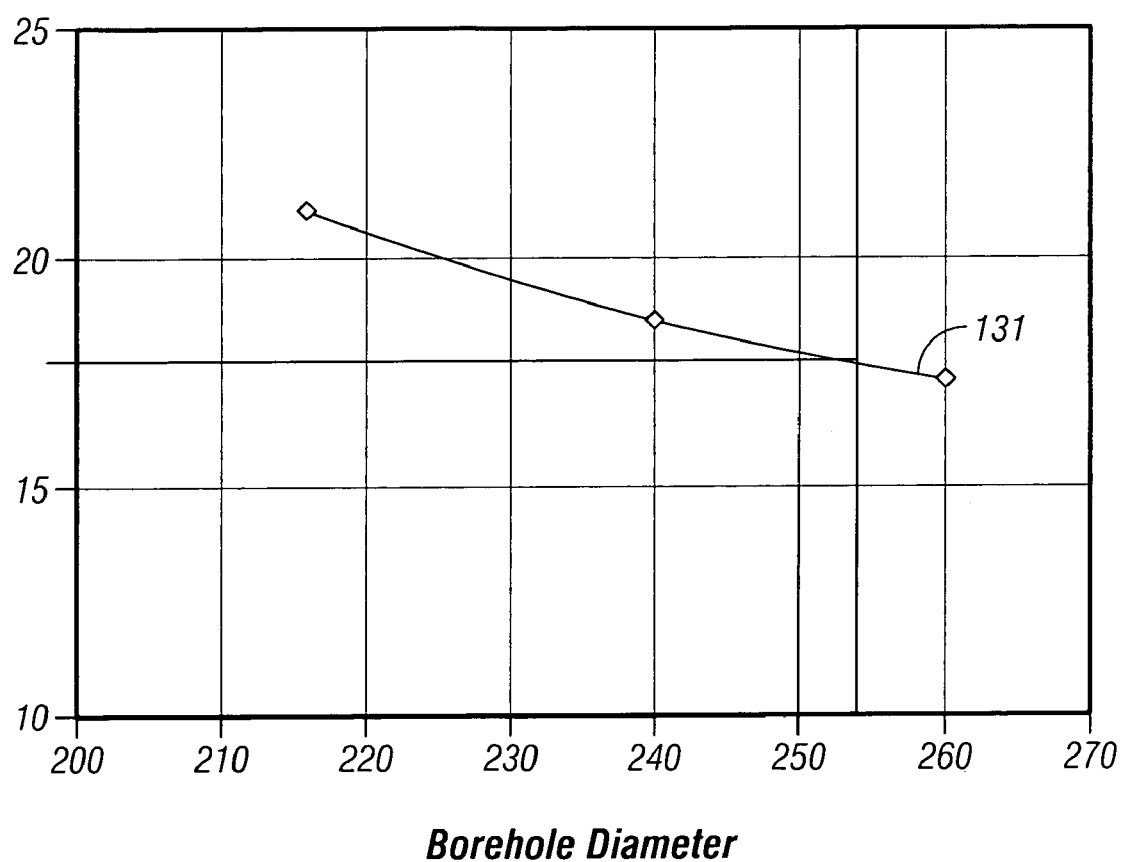
FIG. 3 shows the effect of borehole diameter on the Q of an antenna for an exemplary model.

FIG. 3 is a plot in which the abscissa is the borehole diameter (in mm) and the ordinate is the Q of an exemplary antenna. The curve 131 shows the Q under the assumption that the borehole has a perfectly circular shape. The diagram has been developed with a temperature of 60° C., mud resistivity of 0.048 Ω-m and formation resistivity of 9.1 Ω-m. Taking 10 inches (254.8 mmm) as a maximum borehole diameter, the NMR measurements would be suspect if the measured Q drops below about 17.8.

Figure 4:
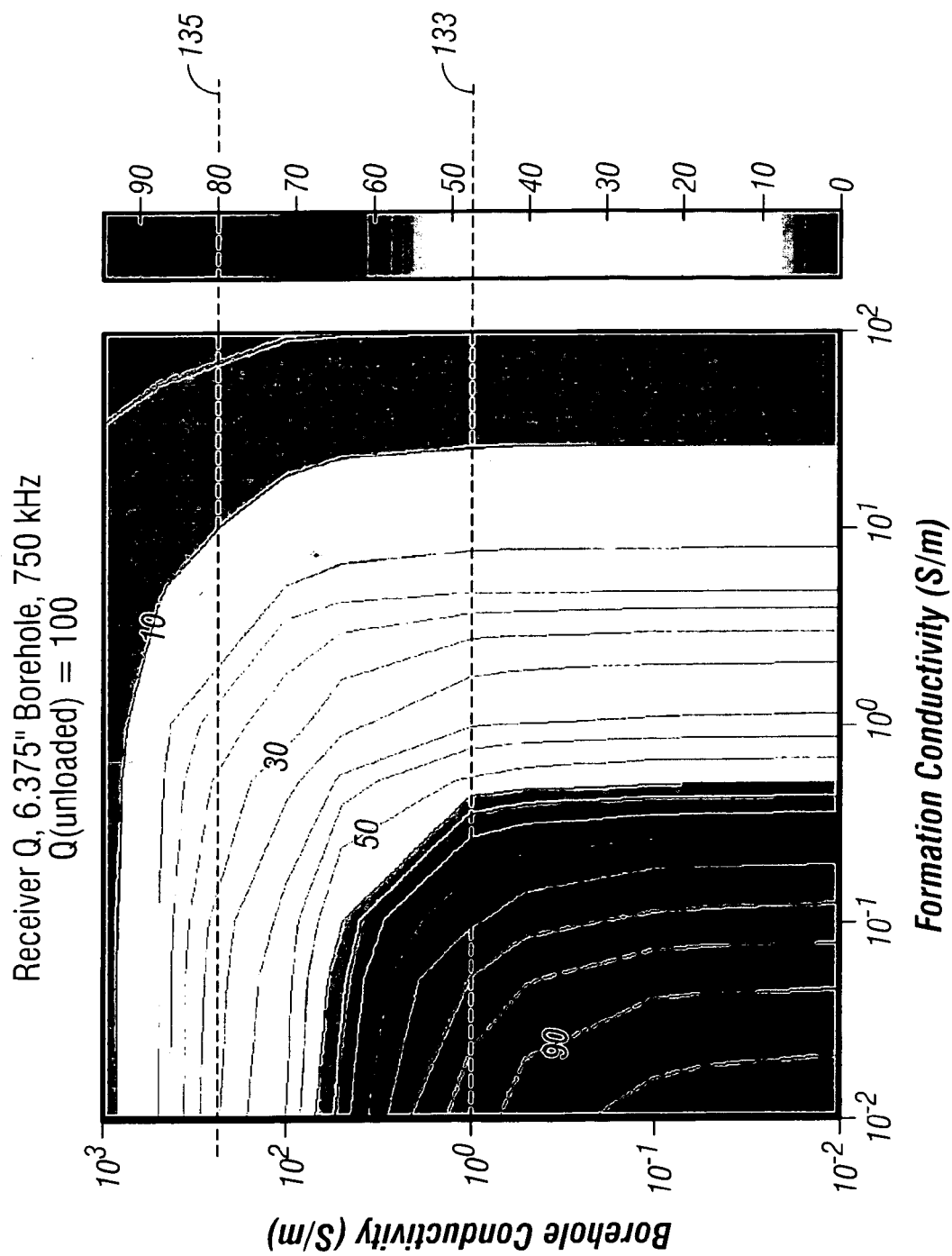
FIG. 4 is a contour plot of the Q of an antenna as a function of formation conductivity and mud conductivity for an exemplary model.

In another embodiment of the invention, the Q of the antenna is used for determining formation properties when the borehole diameter is known. This is particularly useful in wireline applications wherein a caliper (acoustic or mechanical) is used to determine the borehole size. The caliper measurements may also be considered to be a borehole size indicator. FIG. 4 is a simulated Q contour plot as a function of borehole conductivity (ordinate) and formation conductivity (abscissa), computed for a borehole size of 6.375" (16.2 cm) and assuming the unloaded antenna has a Q of 100. For a non-conductive borehole mud, such as the 133 in FIG. 4, the Q value is sensitive to formation conductivity for Q values ranging from 60 to 10, corresponding to the formation conductivity of approximately 0.05-30 S/m. On the other hand, for a very conductive mud in the borehole, such as the line 135 in FIG. 4, the Q value is much less sensitive to the formation conductivity for non-conductive formation but has marginal sensitivity only when formation fluid conductivity contrast is large. The zone of increased sensitivity is particularly useful in distinguishing between a brine-saturated sand and a hydrocarbon-saturated sand. The plot of FIG. 4 suggests the possibility of determining formation resistivity parameters from the Q of the antenna.

Figure 5A:
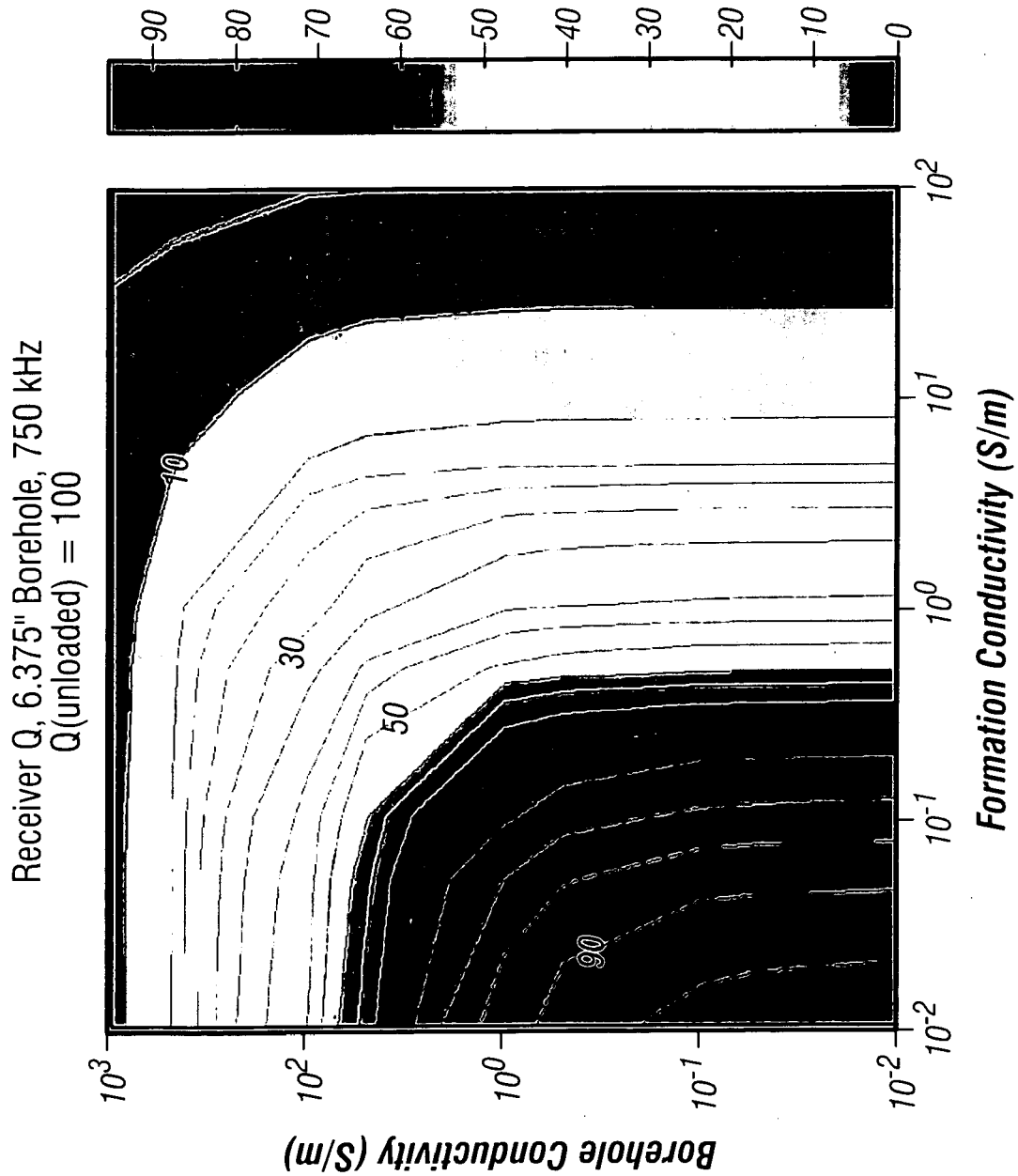
FIGS. 5a-5c show plots showing the effect of borehole diameter on Q for the model of FIG. 4.
Figure 5B:
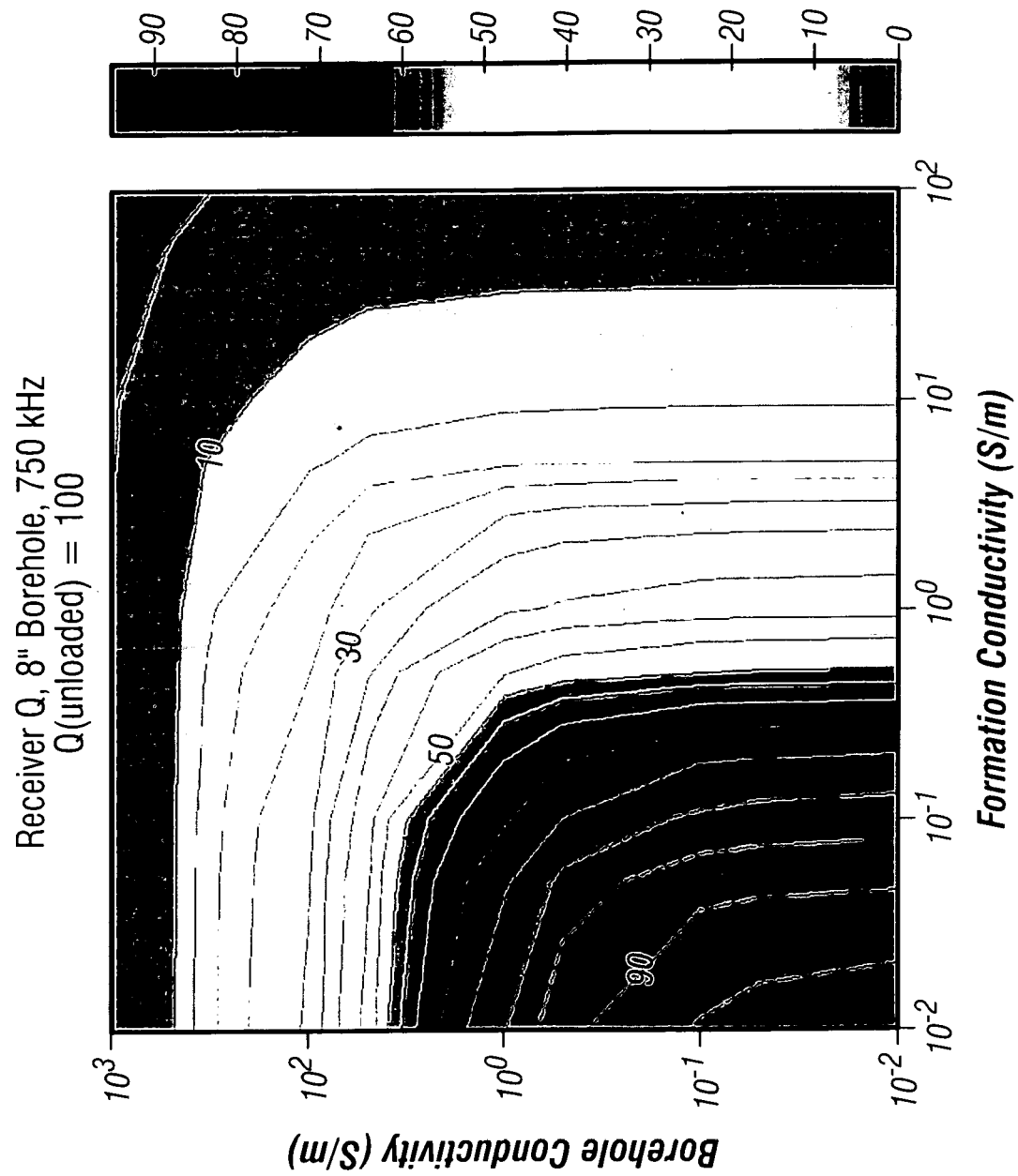
Figure 5C:
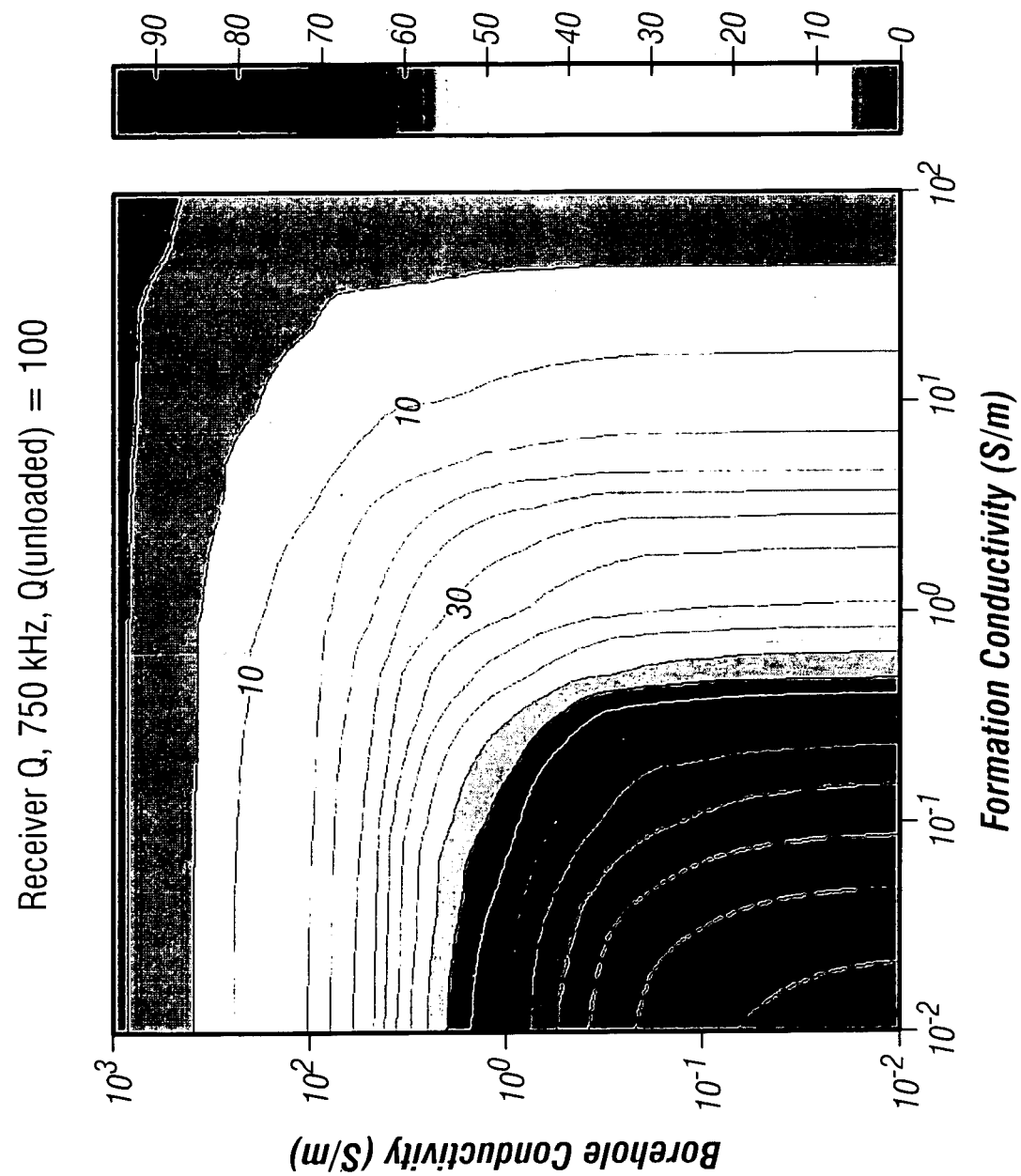

The first step of the processing method for determining formation parameters is to generate a contour plot like that shown in FIG. 4. Because the frequency dependency of Q is predictable depending on the hardware configuration, only one Q contour plot corresponding to one of the operating frequencies is necessary. Alternatively, we can combine all frequency responses and create a "normalized" contour plot. The environmental loading effect is borehole size dependent. This is illustrated in FIGS. 5a-5c which shows the three contour plots corresponding to borehole size of 6⅜" (16.2 cm), 8" (20.3 cm), and 12¼" (31.1 cm), respectively. For the tool for which the plots of FIGS. 5a-5c are generated, the borehole size is not the dominant factor, but the effect could be significant in some borehole and formation conductivity ranges that are of interest in real situations. In the actual interpretation of logging data, caliper measurements are used to select the contour plot from a library of plots. Alternatively, the contour plots may be generated based on the measured borehole diameter. The caliper measurements are also a borehole size indicator. Thus, in one embodiment of the invention, the Q is used in conjunction with either the formation resistivity or the borehole size indicator to determine the other of the formation resistivity and the borehole size indicator.

The mud resistivity or salinity is a required parameter for the method. The mud resistivity is often known prior to logging. Sometimes a range of mud resistivity or salinity is provided at a nominal temperature, rather than the reservoir temperature. In one embodiment of the invention, the mud resistivity may be computed at the reservoir temperature (or the temperature at the depths of interest) using known charts. Alternatively, the mud resistivity may be measured downhole using the apparatus of Fabris et al. For a shale-free water-saturated zone, the deep-reading HDIL resistivity (or equivalent measurements) provides $R_t \approx R_o$. If the reservoir is hydrocarbon-bearing, $R_1 \neq R_o$, but in general $R_o$ is still available as an interpreted result from the resistivity-based log.

Figure 6A:
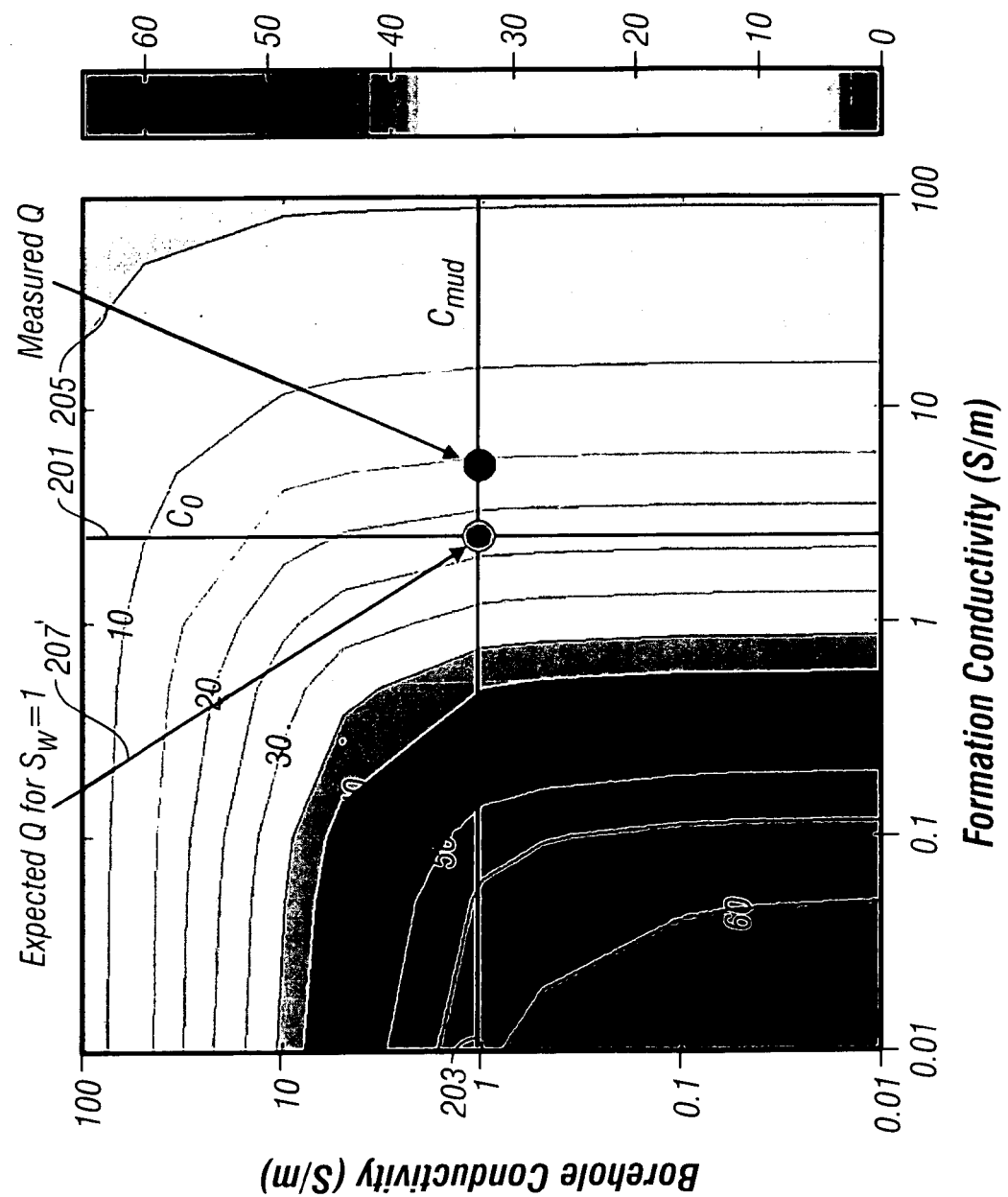
FIGS. 6a and 6b show the effects of hydrocarbons and invasion on the measured Q.
Figure 6B:
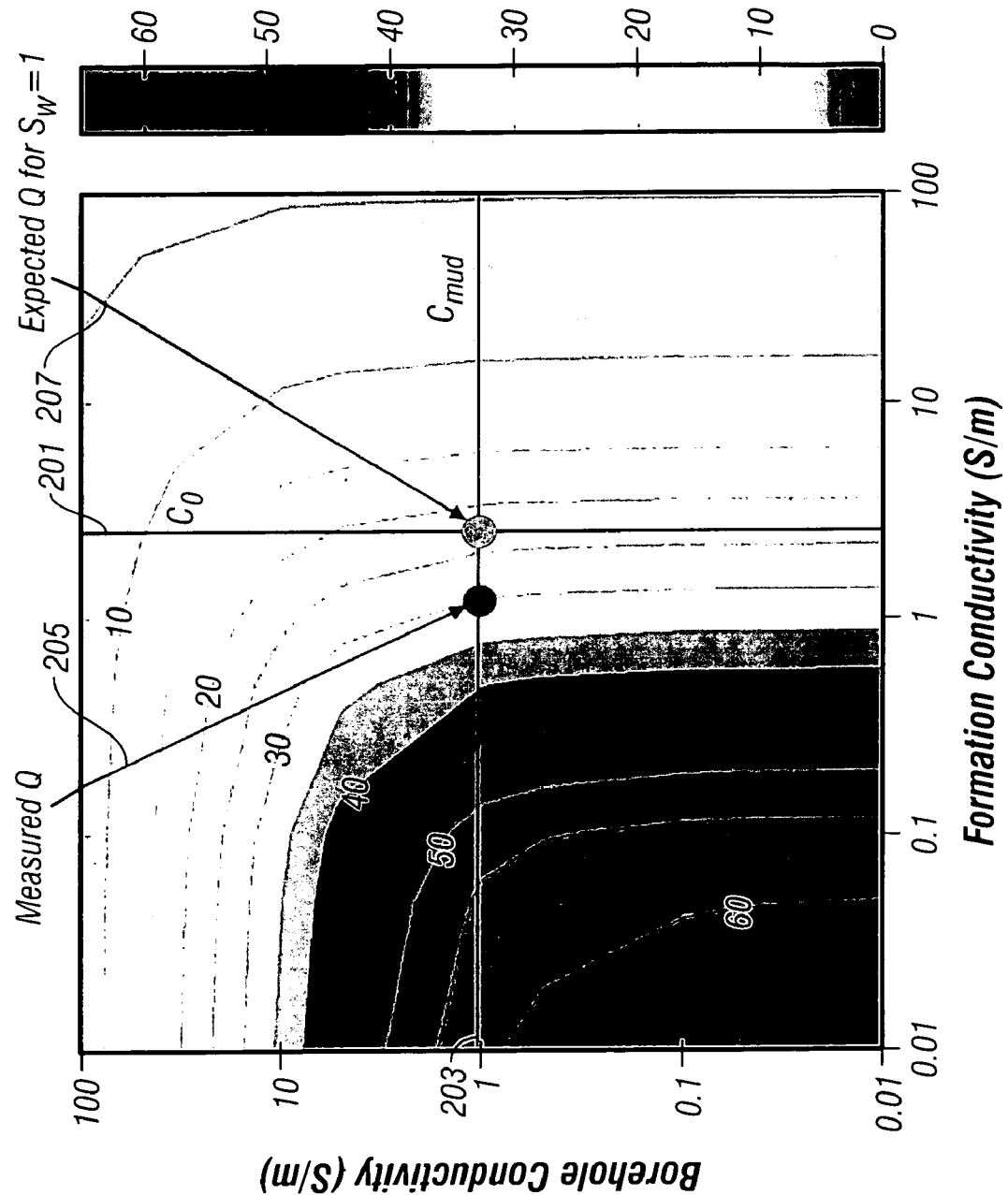

Referring now to FIGS. 6a and 6b, the results of plotting the measured mud conductivity and formation conductivity are shown. In the figures, 201 is the measured conductivity while 203 is the borehole fluid conductivity. The point 207 defined by the intersection of the two lines is the expected Q of the antenna assuming that the formation fluid is 100% water saturated ($S_w$=1.0). Two situations are possible with the actual Q. In the case illustrated in FIG. 6b, the measured Q 205 is greater than the expected Q, while in the case illustrated in FIG. 6a, the measured Q 205' is less than the expected Q. FIG. 6b corresponds to the case where the formation is hydrocarbon bearing. Alternatively, the formation contains a fluid that is more resistive than the formation brine. A Q value greater than expected is thus one of (i) a hydrocarbon indicator, (ii) an indicator that the formation has fresh water in it and has been invaded by oil-based mud filtrate. Knowledge of the specific properties of the mud and the geology can be further used to use an unexpectedly high Q as a hydrocarbon indicator. FIG. 6a corresponds to the case where the formation has been invaded by a conductive fluid. A Q value less than expected can be used as an invasion indicator. The term "invasion" is understood in the art to be the process by which mud filtrate and sometimes whole mud enters a permeable formation. The abscissa 209 corresponding to the measured Q gives the conductivity of the flushed zone in FIG. 6a.

Figure 7:
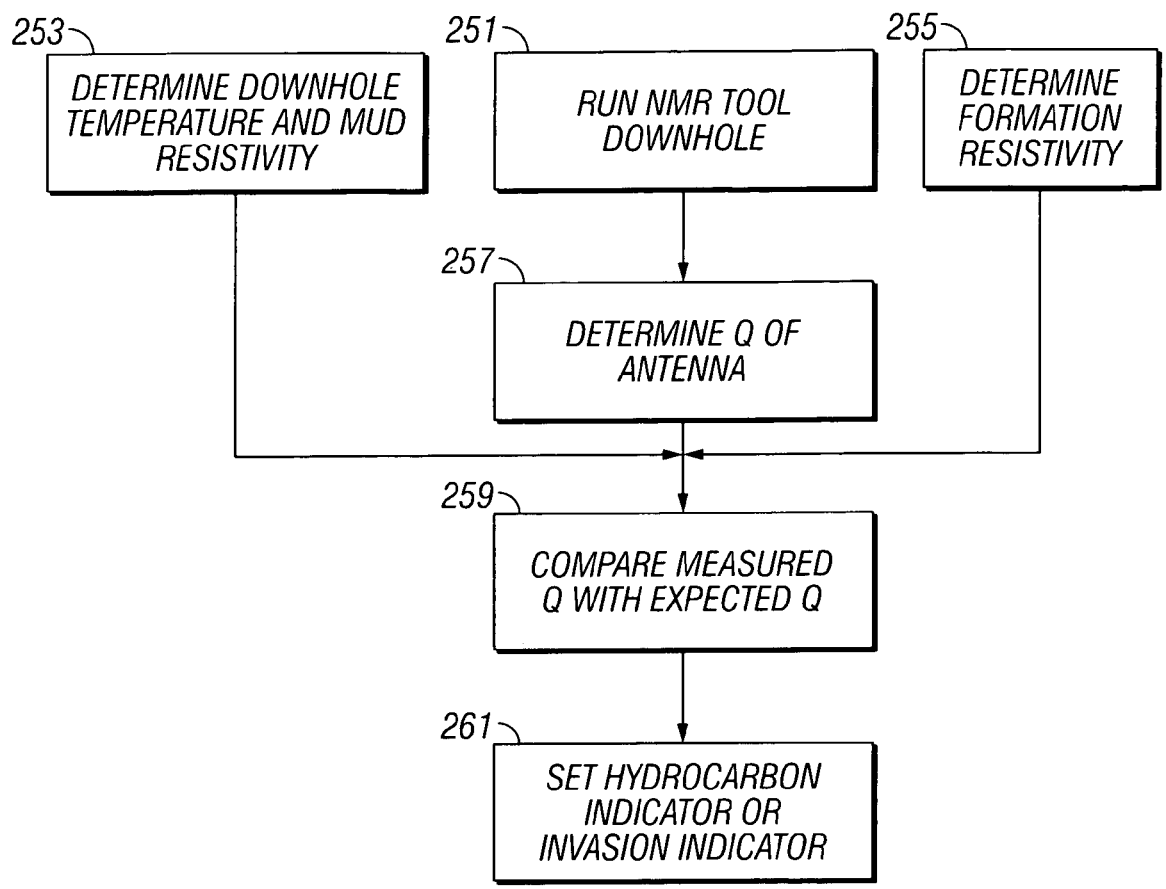
FIG. 7 is a flow chart illustrating an embodiment of the invention for identifying hydrocarbons and fluid invasion.

The use of the measured Q as a hydrocarbon indicator or invasion indicator is depicted in FIG. 7. The NMR tool is run 251 in the borehole. Using the NMR tool, measurements are made of the formation properties using known pulse sequences. In addition, the quality factor (Q) of the antenna is measured 257 using a suitable signal applied to one or more antennas of the antenna arrangement. Concurrently, measurements are also made of the borehole temperature and estimates of the mud resistivity 253. The temperature measurements may be made by a thermometer. In addition, formation resistivity measurements are made 255. For MWD applications, this may be done using the multiple propagation resistivity device disclosed in U.S. Pat. No. 5,491,488 to Wu. For wireline applications, multiarray induction logging tools can be used to determine the formation resistivity. As noted above, measurements of borehole diameter are necessary.

The measured Q is compared to the expected Q for a water saturated formation 259 as discussed above. Based on the comparison, an indicator is set 261 of the presence of hydrocarbons or of invasion of the formation by borehole fluids. This comparison may be done using a table look-up.

It should be noted that while the description of the invention may be in terms of either conductivity or resistivity, it is to be understood to be equally applicable for the other of conductivity and resistivity, and that in the claims of this invention, except where specific equations are involved, the two terms are to be interpreted as completely interchangeable. Where specific equations are involved, conductivity is equivalent to the reciprocal of resistivity.

Since the mud resistivity is normally treated as a constant, if borehole size is not changed, we can fix the contour plot and the $C_{mud}$ line for all depths and plot $C_{xo}$ (conductivity of the invaded zone) for every depth. In the event that the borehole diameter and/or the mud resistivity are changing, one of two approaches can be taken. Both approaches require caliper measurements to get the borehole diameter. In the first approach, suitable interpolation is done from contour plots for different diameters. The second approach is based on the decomposition of the antenna Q into its individual components using the following relation for the measured Q:

$$\frac{1}{Q_{measured}} = \frac{1}{Q_{ant}} + \frac{1}{Q_{form}} + \frac{1}{Q_{bh}}, \quad (2)$$

where $Q_{measured}$ is the measured antenna Q in the borehole, $Q_{ant}$ is the Q of the antenna at no load (a known, measurable quantity), $Q_{form}$ is the loading contribution from the formation and $Q_{bh}$ is the loading contribution from the borehole. The left hand side of eqn. (2) is a measured quantity. $Q_{ant}$ is a known quantity and $Q_{form}$ is determinable once the formation resistivity is known. Thus $Q_{bh}$ is determinable.

To a reasonably good approximation, the borehole loading can be approximated by $$Q_{bh} = A\left(\frac{R_m}{f}\right)^a (d_{bh} - d_t)^b, \quad (3)$$

where $R_m$ is the mud resistivity, $d_{bh}$ is the borehole diameter, $d_t$ is the tool diameter, and A, a and b are fitting parameters that are determined empirically. From eqn.(3), it is thus possible to determine the resistivity of the flushed zones in the formation. Those versed in the art would recognize that it is possible to compute $R_{xo,NMR}(f)$ for every frequency from $Q_{measured}(f)$ thus obtaining flushed zone resistivity as a function of DOI. Practically, it has been found that this determination is best achieved for oil based mud or fresh mud invading a gas well with high brine saturation.

The processing of the data may be accomplished by a downhole processor. Implicit in the control and processing of the data is the use of a computer program implemented on a suitable machine readable medium that enables the processor to perform the control and processing. The machine readable medium may include ROMs, EPROMs, EAROMs, Flash Memories and Optical disks.

The invention has been described with reference to a logging tool conveyed on a drillstring. The method of the present invention is equally applicable for use with NMR logging tools conveyed on a wireline, slickline or coiled tubing. Those versed in the art would recognize that NMR measurements are usually made with relatively low logging speeds, so that by measuring the Q of the NMR antenna, high resolution estimates of borehole size or formation resistivity can be obtained. The results of the processing may be output to a suitable medium and may be used in furthere decisions on drilling and reservoir development.

While the foregoing disclosure is directed to the specific embodiments of the invention, various modifications will be apparent to those skilled in the art. It is intended that all such variations within the scope of the appended claims be embraced by the foregoing disclosure.

What is claimed is:

1. A method of evaluating an earth formation, the method comprising:
   (a) making measurements with a downhole tool in a borehole in the earth formation;
   (b) measuring a Quality factor (Q) of an antenna of the downhole tool at depths where the measurements are made;
   (c) using the measured Q and a resistivity of a mud in the borehole and one of (A) a formation resistivity, and (B) a borehole size indicator (BSI), for estimating the other of the formation resistivity and BSI; and
   (d) storing the estimated other of the formation resistivity and BSI to a suitable medium.

2. The method of claim 1 wherein a BSI is estimated in step (c) of claim 1, the method further comprising:
   estimating a property of the earth formation using measurements at depths selected using the BSI.

3. The method of claim 2 further comprising measuring the resistivity of the formation.

4. The method of claim 1 wherein a BSI is estimated in step (c) of claim 1 and wherein the measurements comprise multivolume Nuclear Magnetic Resonance measurements; the method further comprising estimating a property of the earth formation from the multivolume NMR measurements.

5. The method of claim 4 further comprising measuring the resistivity of the formation.

6. The method of claim 1 wherein a formation resistivity is estimated in step (c) of claim 1, the method further comprising making measurements with a caliper.

7. The method of claim 1 further comprising conveying the downhole tool into the borehole on a conveyance device selected from (i) a wireline, and (ii) a bottomhole assembly on a drilling tubular.

8. The method of claim 1 further comprising measuring the resistivity $R_t$ of the mud in the borehole.

9. An apparatus for evaluating an earth formation, the apparatus comprising:
   (a) a downhole tool conveyed in a borehole in the earth formation;
   (b) an antenna on the NMR tool configured to generate a radio-frequency signal in the earth formation;
   (c) a processor configured to:
      (A) estimate a quality factor (Q) of the antenna of the downhole tool, and
      (B) use the estimated Q, a resistivity of the mud in the borehole and one of (I) a formation resistivity and (II) a borehole size indicator (BSI) to estimate the other of the formation resistivity and the BSI.

10. The apparatus of claim 9 wherein the processor in step (c)(B) is configured to estimate the BSI, the processor being further configured to estimate a property of the earth formation measurements at depths selected using the BSI.

11. The apparatus of claim 10 further comprising a resistivity measuring device configured to measure a resistivity of the formation.

12. The apparatus of claim 9 wherein the processor in step (c)(B) is configured to estimate the BSI, the downhole tool comprises a multivolume Nuclear Magnetic Resonance tool and the processor is further configured estimate a property of the earth formation using the measurements.

13. The apparatus of claim 12 further comprising a resistivity measuring device configured to measure a resistivity of the formation.

14. The apparatus of claim 9 further comprising a conveyance device selected from (i) a wireline, and (ii) a drilling tubular.

15. The apparatus of claim 9 further comprising a device which measures a resistivity of the mud.

16. The apparatus of claim 9 wherein the processor in step (c)(B) is configured to estimate the formation resistivity, the apparatus further comprising a caliper configured to measure a size of the borehole.

17. A method of evaluating an earth formation, the method comprising:
   (a) making measurements with a downhole tool in a borehole in the earth formation;
   (b) measuring a Quality factor (Q) of an antenna of the NMR tool;
   (c) using the measured Q, a resistivity $R_m$ of a mud in the borehole, a formation resistivity $R_t$ and a borehole size indicator for estimating at least one of (A) a hydrocarbon indicator, and (B) an invasion indicator.
   (d) storing the estimated at least one of (A) the hydrocarbon indicator, and (B) the invasion indicator to a suitable medium.

18. The method of claim 17 wherein step (c) further comprises comparing the estimated Q with a Q of a water-saturated formation.

19. The method of claim 17 further comprising obtaining the borehole size indicator using a caliper.

20. An apparatus for evaluating an earth formation, the apparatus comprising:
   (a) a downhole tool conveyed in a borehole in the earth formation;
   (b) a processor configured to:
      (A) estimate a quality factor (Q) of the antenna of the downhole tool, and
      (B) use the estimated Q, a resistivity of a mud in the borehole, a formation resistivity and a borehole size indicator to estimate at least one of (I) a hydrocarbon indicator, and (II) an invasion indicator.

21. The apparatus of claim 20 further comprising a device which measures the resistivity of the mud in the borehole.

22. The apparatus of claim 20 further comprising a device which measures the formation resistivity.

23. The apparatus of claim 20 further comprising a caliper which measures a size of the borehole.

24. The apparatus of claim 20 further comprising a conveyance device selected from (i) a wireline, and (ii) a drilling tubular.

* * * * *

UNITED STATES PATENT AND TRADEMARK OFFICE
CERTIFICATE OF CORRECTION

PATENT NO. : 7,425,827 B2  
APPLICATION NO. : 11/541227  
DATED : September 16, 2008  
INVENTOR(S) : Songhua Chen et al.

It is certified that error appears in the above-identified patent and that said Letters Patent is hereby corrected as shown below:

Column 9, line 35, insert --(NMR)-- after "Nuclear Magnetic Resonance";

Column 9, line 53, delete "on the NMR tool", insert --of the downhole tool--;

Column 10, line 9, delete "configured", insert --configured to--; and

Column 10, line 28, delete "NMR", insert --downhole--.

Signed and Sealed this

Twenty-seventh Day of January, 2009

JOHN DOLL  
*Acting Director of the United States Patent and Trademark Office*